(12) United States Patent
Kubo et al.

(10) Patent No.: US 7,495,658 B2
(45) Date of Patent: Feb. 24, 2009

(54) CONTROL DEVICE, ELECTRONIC APPARATUS AND MEDIUM FOR OUTPUTTING INFORMATION IN ACCORDANCE WITH AN OPERATION RELATIVE TO AN INPUT DEVICE

(75) Inventors: Takeshi Kubo, Kawasaki (JP); Tsuyoshi Kuribayashi, Kawasaki (JP); Naoya Endo, Kawasaki (JP); Akinori Kimoto, Minoo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/814,834

(22) Filed: Mar. 23, 2001

(65) Prior Publication Data
US 2002/0063696 A1 May 30, 2002

(30) Foreign Application Priority Data
Nov. 27, 2000 (JP) ............................. 2000-360192

(51) Int. Cl.
*G09G 5/00* (2006.01)
(52) U.S. Cl. ...................... 345/173; 345/174; 345/175; 345/178; 345/179; 178/18.01
(58) Field of Classification Search ......... 345/173–175, 345/177–179, 156–157, 163, 169; 178/18.01
See application file for complete search history.

(56) References Cited

U.S. PATENT DOCUMENTS

| 5,266,931 | A | * | 11/1993 | Tanaka | 345/173 |
| 5,561,447 | A | * | 10/1996 | Suzuki et al. | 345/179 |
| 5,583,543 | A | * | 12/1996 | Takahashi et al. | 345/173 |
| 5,666,113 | A | * | 9/1997 | Logan | 341/34 |
| 5,670,987 | A | * | 9/1997 | Doi et al. | 345/156 |
| 5,926,178 | A | * | 7/1999 | Kurtenbach | 715/834 |
| 5,974,558 | A | * | 10/1999 | Cortopassi et al. | 713/323 |
| 5,990,875 | A | * | 11/1999 | Bi et al. | 345/179 |
| 6,104,317 | A | * | 8/2000 | Panagrossi | 341/20 |
| 6,262,719 | B1 | * | 7/2001 | Bi et al. | 345/179 |

FOREIGN PATENT DOCUMENTS

| JP | 05-108607 | | 4/1993 |
| JP | 05-143235 | | 6/1993 |
| JP | 05-274477 | | 10/1993 |
| JP | 09-120333 | * | 6/1997 |
| JP | 10-187351 | | 7/1998 |

* cited by examiner

*Primary Examiner*—Richard Hjerpe
*Assistant Examiner*—Leonid Shapiro
(74) *Attorney, Agent, or Firm*—Staas & Halsey LLP (57) ABSTRACT

An object of the present invention is to provide an accurate positioning function with respect to an object and program generating an operation by depression and its depression release. The present invention provides a control device (1) for outputting an information in accordance with an operation with respect to an input device. The control device (1) comprises: a detection unit (8) for detecting a release of depression with respect to the input device; and an output unit (8) for outputting an information indicative of a depression with respect to the input device and an information indicative of a depression release when detecting a release of the depression.

8 Claims, 7 Drawing Sheets

CONTROL DEVICE, ELECTRONIC APPARATUS AND MEDIUM FOR OUTPUTTING INFORMATION IN ACCORDANCE WITH AN OPERATION RELATIVE TO AN INPUT DEVICE

BACKGROUND OF THE INVENTION

1. Field of the Invention

The present invention relates to a control for an input-output device.

2. Description of the Related Art

Conventionally, various technologies have been proposed in order to improve an operability of input devices such as a tablet, a touch panel, a mouse or the like. For example, Japanese Patent Application Laid-Open No. 5-143235 has described the following purpose. More specifically, in a computer connected with a touch screen, the purpose is to input a desired input coordinate to the computer in a manner that a position where user's finger touches on the touch screen is confirmed.

For this reason, the computer reads a coordinate where user's finger touches on the touch screen, and then, moves a cursor together with movement of the user's finger. When the user's finger is released from the touch screen, the computer has captured the input position data just before the release as an input coordinate data.

Moreover, JP-A No. 10-187351 has disclosed a copying machine. The copying machine displays a recording material selection range and a tone (gray level) selection range when depressing a touch panel. In a state of depressing the touch panel, a user can move the recording material selection range and the tone selection range while touching his finger thereon. Then, the user selects the recording material and tone by releasing his finger from the touch panel.

However, according to the aforesaid technologies, when the user's finger is released from the touch panel, a coordinate just before finger release has been inputted as an input coordinate. For this reason, these technologies are not applicable to devices in which an operation is generated by depression to the touch panel and release from there. In particular, an operation becomes invalid with respect to an object such as a button used in a recent event driven type operating system and an application software. This is because the depression of touch panel is not recognized in a position where the touch panel is released.

Moreover, according to these conventional technologies, when a position is finally selected, the finally selected position is only recognized; for this reason, it is impossible to generate an effect by a time lag between depression with respect to the object and its release. For example, it is impossible to change the state of the object after detecting the release of the depression to an object, to make the state being continued for a predetermined time, to generate an operation by the release of depression.

SUMMARY OF THE INVENTION

The present invention has been made in view of the above problem arisen in the prior art. It is, therefore, an object of the present invention to provide an accurate positioning function with respect to an object or program generating an operation by depression and its depression release.

Further, another object of the present invention is to provide a technology, which can generate a time effect between depression and its depression release by an input device in an object selected by the positioning function.

In order to achieve the above objects, the present invention has employed the following means.

More specifically, the present invention provides a control device (2) for outputting an information in accordance with an operation with respect to an input device, comprising a detection unit (8) for detecting a release of depression with respect to the input device and an output unit (8) for outputting an information indicative of a depression with respect to the input device and an information indicative of a depression release when detecting a release of the depression.

Preferably, the detection unit (8) detects a depression with respect to the input device, and the output unit (8) makes invalid an information output indicative of the depression when the depression with respect to the input device is detected.

Preferably, the output unit (8) outputs an information indicative of a release of the depression after a predetermined time elapses from the information output indicative of the depression.

Preferably, the detection unit (8) detects a movement operation with respect to the input device, and the output unit (8) outputs a position on a screen of display device corresponding to the movement operation.

Preferably, the output unit (8) decides whether or not the information indicative of the depression is outputted at a time selected among a time when a release of the depression is detected or a time when a depression is made with respect to the input device, in accordance with a mode of controlling the information output indicative of the depression.

Preferably, the above input device is a tablet.

Further, the present invention provides an electronic apparatus (1) including an input device, comprising a detection unit (7, 8) for detecting a release of depression with respect to the input device;

an output unit (7, 8) for outputting an information indicative of a depression with respect to the input device and an information indicative of a depression release when detecting a release of the depression; and a processing unit (9) for executing processing in accordance with the information output.

Further, the present invention provides a control method for an input device, comprising the following steps of detecting a release of depression with respect to an input device (step S7, step S26), and outputting an information indicative of depression and an information indicative of a release of the depression when the release of depression is detected (step S28).

Further, the present invention provides a computer readable recording medium recording a program for realizing the functions as described above by a computer.

As seen from the above description, according to the present invention, it is possible to provide an accurate positioning function with respect to an object and program generating an operation by depression and its depression release.

Moreover, according to the present invention, it is possible to generate a time effect between depression and its depression release in an object and program selected by the positioning function.

DETAILED DESCRIPTION OF THE PREFERRED EMBODIMENT

One embodiment of the present invention will be described below with reference to FIG. 1 to FIG. 7.

Figure 1:
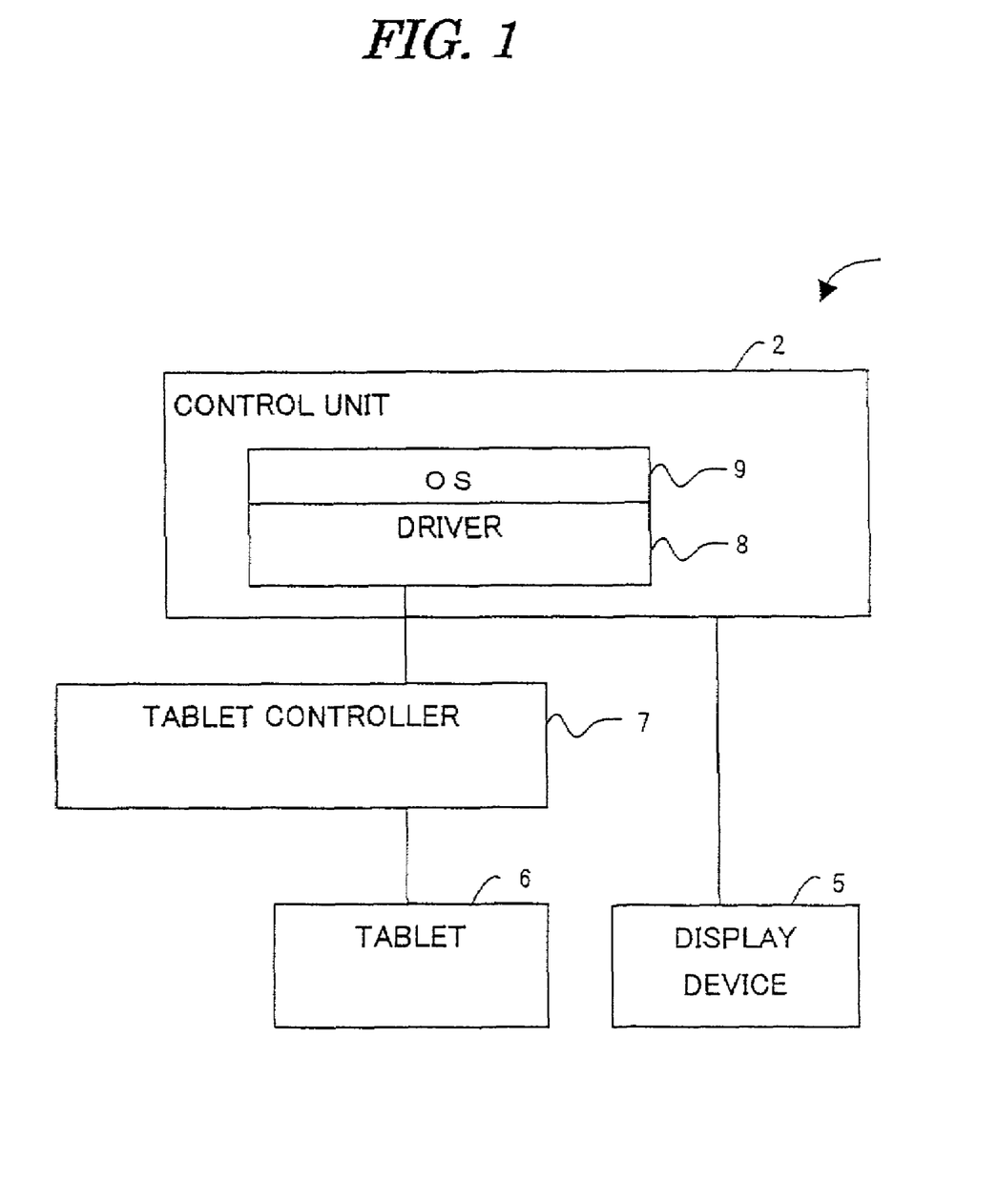
FIG. 1 is a view schematically showing a system configuration of a pen-operating computer 1 according to one embodiment of the present invention.
Figure 2:
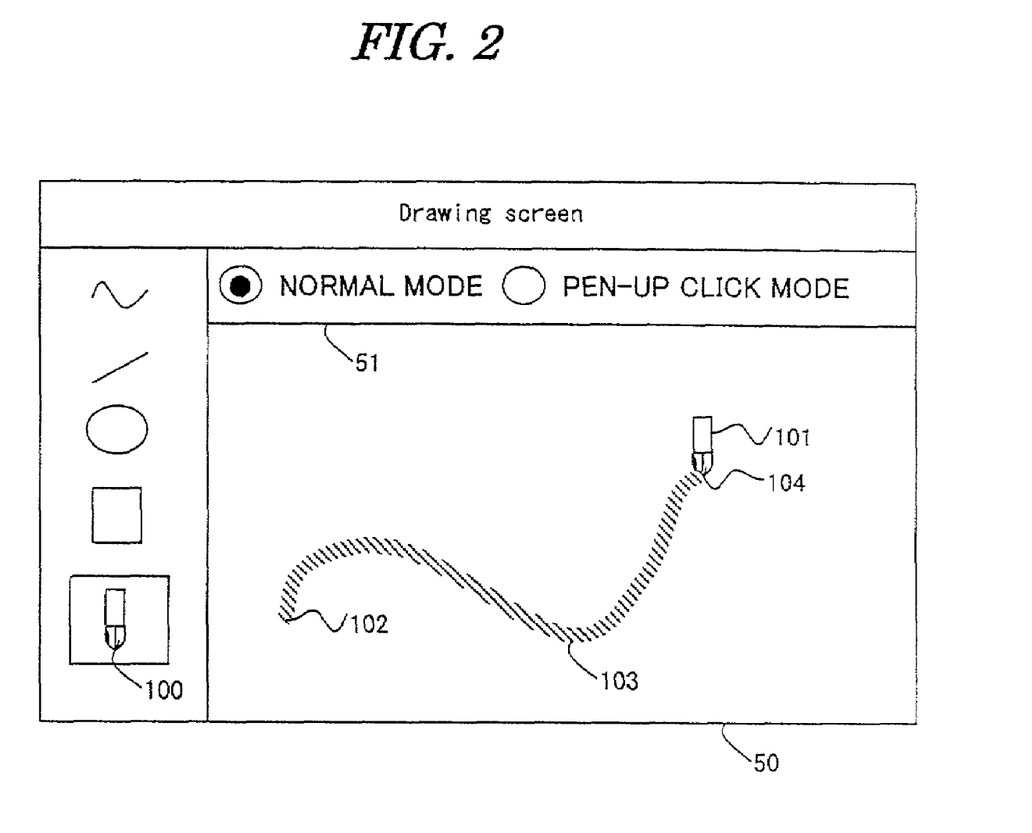
FIG. 2 is a view showing a drawing operation example (1) of the pen-operating computer 1.
Figure 3:
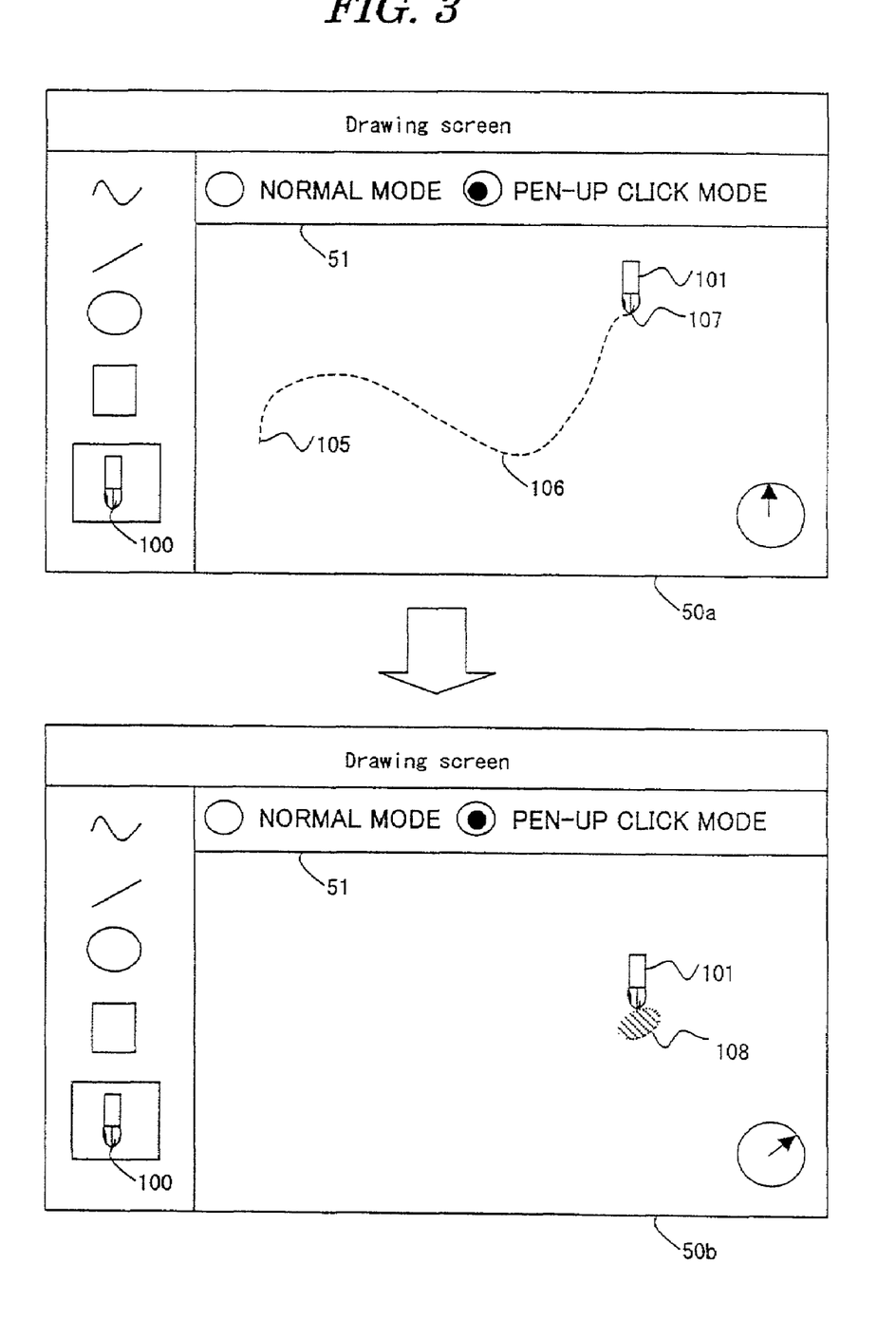
FIG. 3 is a view showing a drawing operation example (2) of the pen-operating computer 1.
Figure 4:
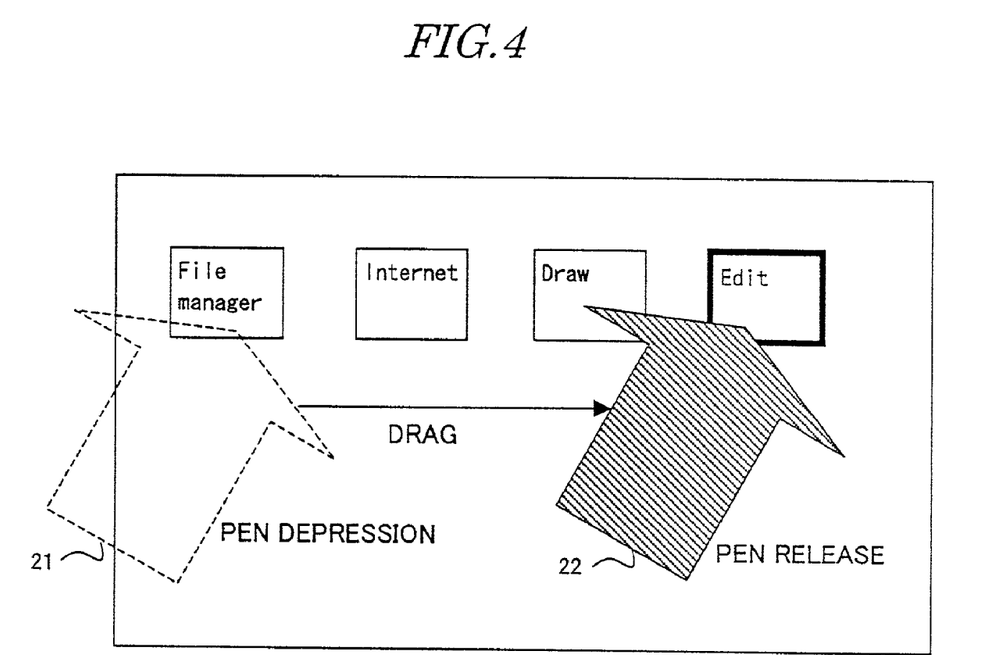
FIG. 4 is a view showing an operation example on a desktop screen in the pen-operating computer 1.
Figure 5:
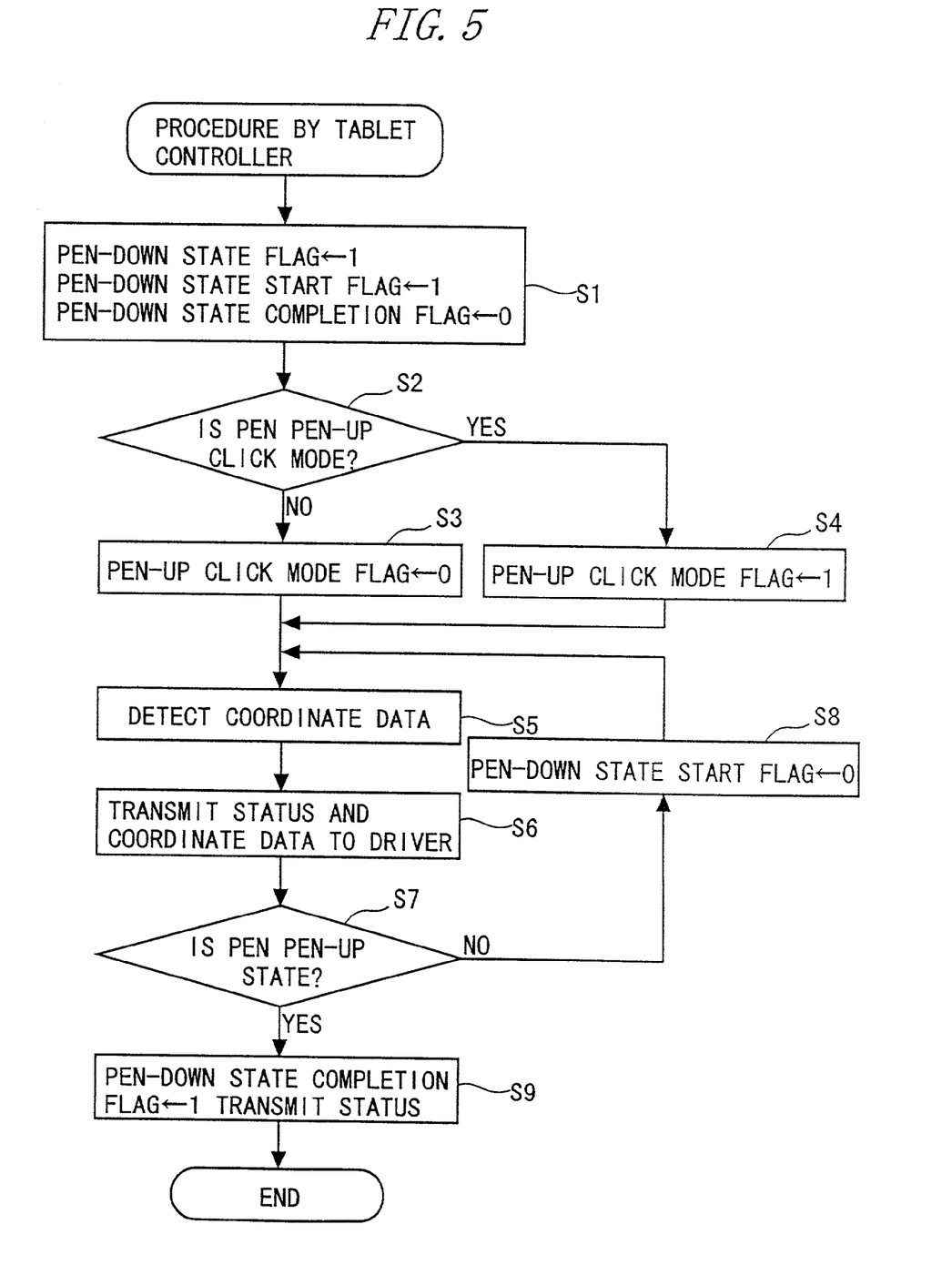
FIG. 5 is a flowchart showing a procedure by a tablet controller 7.
Figure 6:
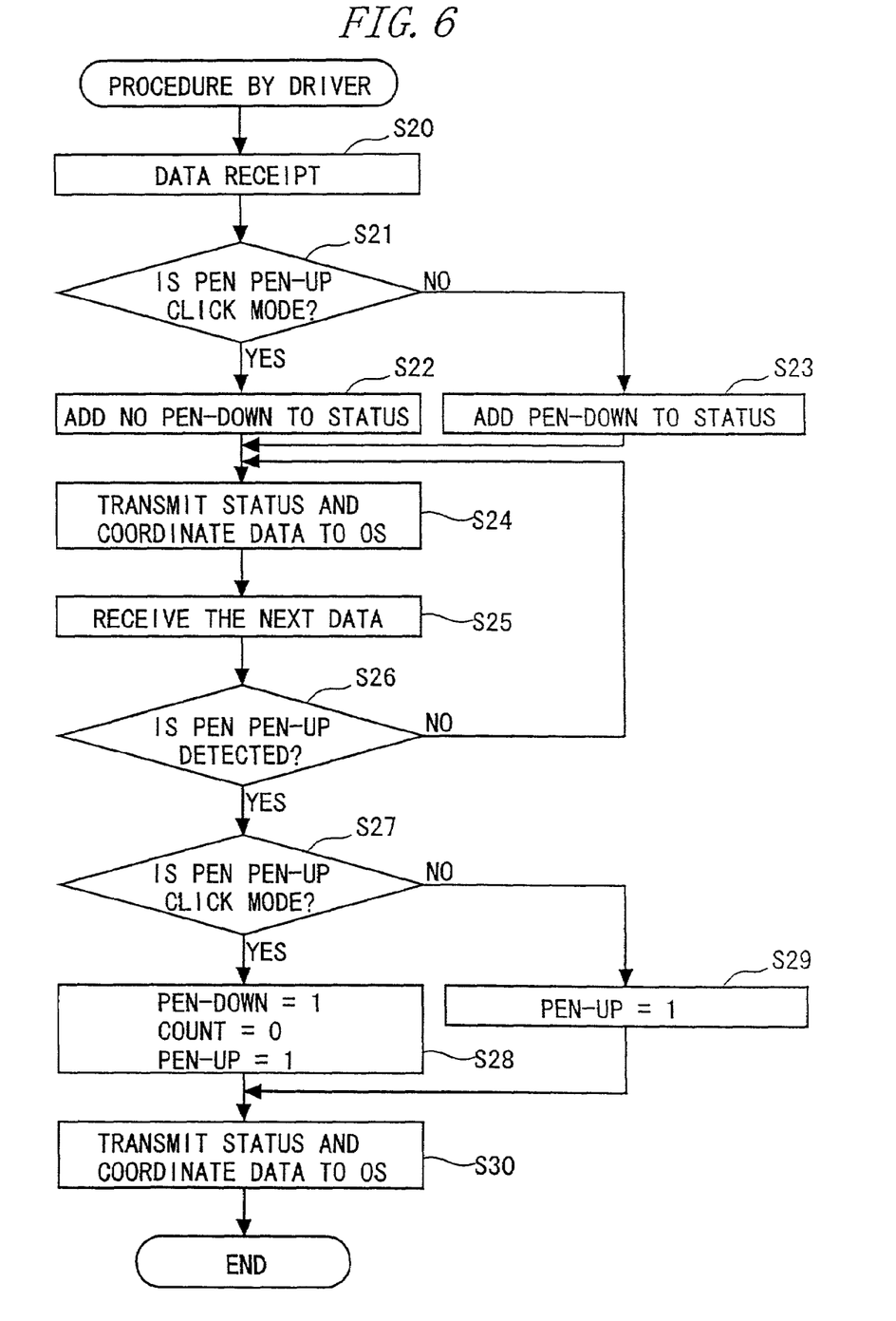
FIG. 6 is a flowchart showing a procedure by a driver 8.
Figure 7:
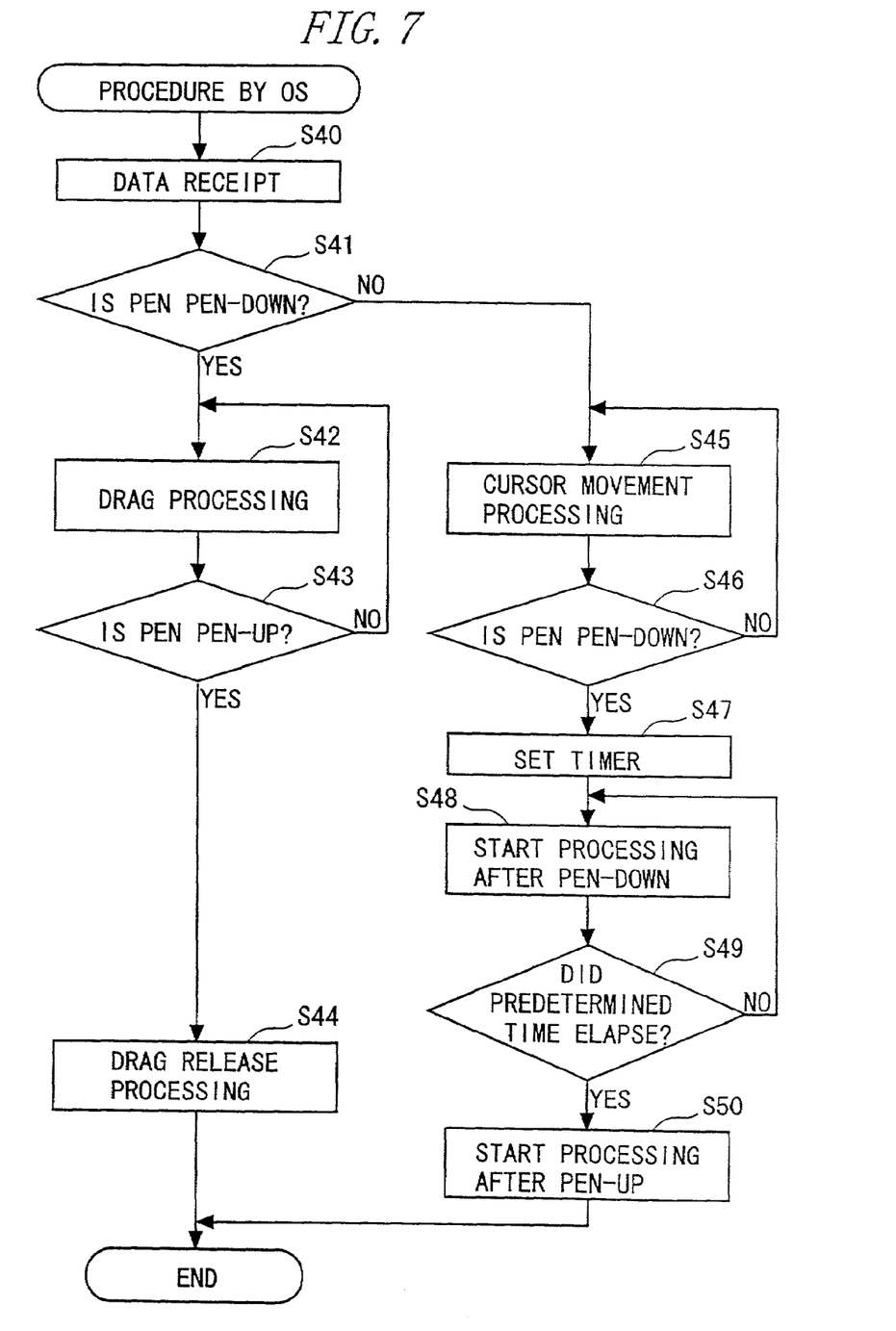
FIG. 7 is a flowchart showing a control procedure by an operating system (OS) 9.

FIG. 1 is a view schematically showing a system configuration of a pen-operating computer 1 according to one embodiment of the present invention. FIG. 2 and FIG. 3 are views showing a drawing operation example by the pen-operating computer 1. FIG. 4 is a view showing an operation example on a desktop screen in the pen-operating computer 1. FIG. 5 is a flowchart showing a procedure by a tablet controller 7 shown in FIG. 1. FIG. 6 is a flowchart showing a procedure by a driver 8 shown in FIG. 1. FIG. 7 is a flowchart showing a control procedure by an operating system (OS) 9 shown in FIG. 1.

<System Configuration>

In FIG. 1, there is shown a system configuration of a pen-operating computer 1. The pen-operating computer 1 has a control unit 2, a display device 5 connected to the control unit 2, a tablet 6 using a coordinate system corresponding to a coordinate of the display device 5 for detecting a user's pen operation, and a tablet controller 7 for transmitting the user's pen operation detected by the tablet 6 to the control unit 2 so as to control the tablet 6.

The tablet 6 is a transparent flat-plate sensor, and is arranged in a state of being overlapped with the display device 5. Further, the tablet 6 detects a pen operation onto the surface thereof, and then, generates an electric signal indicative of the coordinate. The combination of the display device 5 and the tablet 6 is called as a touch panel or touch screen.

In this case, the sensor of tablet 6 may be any of pressure sensitive, electrostatic, ultrasonic wave systems. The depression operation may be made by a pen and human finger. Hereinafter, an operation of the tablet 6 by the pen will be described as an example.

The tablet controller 7 detects an electric signal generated by the above pen operation, and then, transmits it to the control unit 2. Moreover, the tablet controller 7 has an A/D converter and CPU which are not shown, and reports the pen operation, that is, a coordinate indicative of each pen position in depression start, depression release and depressed states, to the control unit 2.

The display device 5 displays menu and icon operated by a user, messages replay to user's operation and the like. For example, a CRT, liquid crystal display and the like are used as the display device 5.

The control unit 2 is composed of a memory and CPU, which are not shown. In the memory, programs such as operating system (OS) 9 and driver 8 are expanded. The CPU executes these programs described above so as to provide a function of the pen-operating computer 1.

The driver 8 detects a signal from the tablet controller 7, and then, transmits the detected signal to the OS 9. The tablet controller 7 and the driver 8 are equivalent to a detection unit. In addition, tablet controller 7 and the driver 8 are equivalent to an output unit.

The OS 9 recognizes a pen operation to the tablet 6 via the driver 8. Further, in accordance with the pen operation, the OS 9 displays a predetermined information, for example, a pointer (also, called as "cursor"), menus, icons on the display device 5. Furthermore, the OS 9 or application program executed on the OS 9 is equivalent to a processing unit.

<Pen Operation Function>

Each of FIG. 2 to FIG. 4 shows an example of function provided in accordance with a pen operation to the tablet 6. Each of FIG. 2 and FIG. 3 shows a screen 50 of drawing program executed by the pen-operating computer 1. The screen 50 is composed of a title bar to which a character "Drawing screen" is given, an operation mode selection menu 51 arranged at a lower portion of the title bar, a drawing command group at the left-handed portion of the screen 50, and a drawing area.

The operation mode selection menu 51 is a menu for making a changeover between operation modes, that is, a normal mode and a pen-up click mode. The normal mode is an operation mode of detecting the depression start when a pen depresses the tablet 6, and detecting the depression release when the pen is released from the tablet 6.

On the other hand, the pen-up click mode is an operation mode of making no detection of the depression start when the pen depresses the tablet 6, and detecting the depression start and the depression release when the pen is released from the tablet 6. In this case, in the pen-up click mode, a pen-moving operation during pen depression is reported from the tablet 6 to the control unit 2, like the normal mode. Therefore, in the pen-up click mode, when the pen depresses the tablet 6, an instruction by the depression is made invalid, and as a result, a coordinate corresponding to the depressed position is captured like the normal mode.

A setup as to whether the operation mode is the normal mode or the pen-up click mode is stored in a mode register readable from the control unit 2 and the tablet controller 7.

Moreover, the user depresses any symbol of drawing command group by pen, and thereby, the drawing mode can be change over. FIG. 2 shows a state that a filling command (brush-shaped symbol 100) is selected in the normal mode.

In this case, the pen position is displayed by a brush-shaped pointer 101. In this state, the user depresses a desired position on the drawing area by pen, and then, drags the pen while contacting it with the tablet 6, and thereby, can fill a desired portion with a predetermined color. Hereinafter, as described above, the operation of moving the pen while contacting it with the tablet 6 is called as "drag".

More specifically, as shown in FIG. 2, drawing is started from a pen depressed position 102, and then, a route (path) 103 is filled having a predetermined pen width. The filling of the path 103 is completed at a pen release position 104. At this time, the brush-shaped pointer 101 is stopped at the pen release position 104.

FIG. 3 shows a drawing function by a filling command in the pen-up click mode. In this state, the pen position is displayed by the brush-shaped pointer 101.

In the pen-up click mode, a route 106 is not filled even in the case where the user starts a drag from a pen depression position 105. During this drag operation, a coordinate on the route is reported from the tablet 6 to the control unit 2, and then, the brush-shaped pointer 101 is displayed on the position corresponding to the coordinate thus reported.

When the user releases the pen at a pen release position 107, the brush-shaped pointer 101 is stopped at the pen release position 107. Then, the pen release position is gradually filled in a predetermined time (see screen 50a 50b).

FIG. 4 shows an operation example on a desktop screen of the pen-operating computer 1 in the case where the operation mode is a pen-up click mode. In the desktop screen, four icons, that is, "File manager", "Internet", "Draw" and "Edit" are displayed. An arrow 22 shown in FIG. 4 is a pointer indicative of a pen position. FIG. 4 shows a state that in the desktop screen, the user depresses a pen at a position of a broken line arrow 21, and drags the pen to the right-handed side on the desktop screen while depressing the pen, and thereafter, releases the pen at the position of the arrow 22.

In such a case, the pen-operating computer 1 moves the pen position as it is, and then, makes valid the pen depression and the depression release at the point of time when the user releases the pen from the tablet 6. As a result, the pen depression and the depression release are executed with respect to the icon "Edit" existing on the position where the pen is released, and then, predetermined processing, for example, editor is started up.

<Operation and Effect>

[Procedure by Tablet Controller 7]

FIG. 5 shows a procedure of control program executed by the tablet controller 7. When detecting a pen depression to the tablet 6, the tablet controller 7 starts up the control program.

First, the tablet controller 7 initializes a flag (step S1). By doing so, the following flags are set; more specifically, pen-down state flag=1, pen-down state start flag=1, and pen-down state completion flag=0. Hereinafter, these flags are referred to as status.

In this case, the pen-down state flag is a flag representing whether or not a pen is in a pen-down (depression of table 6) state. In the case of the pen-down state flag=1, it is shown that the pen is in a pen-down state.

The pen-down start flag is a flag indicative that a pen-down (depression of the tablet 6) state is started. In the case of the pen-down state start flag=1, it is shown that the pen-down is started. This pen-down start flag is cleared after a predetermined step from the pen-down state starts. In other words, for the duration that the pen drags the surface of the tablet 6, the pen-down state start flag=0 is set.

The pen-down state completion flag is a flag indicative that a pen-down (depression of tablet 6) state is ended. In the case of the pen-down state completion flag=1, it is shown that the pen-down state is completed.

Next, the tablet controller 7 makes a judgment whether an operation mode is a pen-up click mode or normal mode (step S2). More specifically, the tablet controller 7 reads a setup data stored in the mode register so as to judge the operation mode.

In the case where the operation mode is not the pen-up click mode, the tablet controller 7 sets a pen-up click mode flag to "0" (step S3). On the other hand, in the case where the operation mode is the pen-up click mode, the tablet controller 7 sets a pen-up click mode flag to "1" (step S4).

Subsequently, the tablet controller 7 detects a coordinate corresponding to the pen position on the tablet 6 (step S5).

Subsequently, the tablet controller 7 transmits the above status and coordinate data to the driver 8 of the control unit 2 (step S6).

Subsequently, the tablet controller 7 makes a judgment whether or not a pen is in the pen-up state (state that pen is released from the tablet 6) (step S7). In the case where the pen is not in the pen-up state, the tablet controller 7 clears the pen-down start flag to "0" so as to return the control sequence to step S5. In the manner as described above, the tablet controller 7 continues to transmit the coordinate data until the pen becomes the pen-up state.

On the other hand, in the case where the pen is in the pen-up state, the tablet controller 7 set the pen-down state completion flag to "1", and then, transmits the status to the driver 8 of the control unit 2. Thereafter, the tablet controller 7 ends the control program.

[Procedure by Driver 8]

FIG. 6 shows a procedure by the driver 8 executed in the control unit 2. When receiving a data from the tablet controller 7, the control unit 2 drives the driver 8 so that the driver 8 executes processing with respect to the received data.

First, the driver 8 receives a data from the tablet controller 7 (step S20).

Then, the driver 8 reads the mode register so as to make a judgment whether or not an operation mode is a pen-up click mode (step S21) In the case where the operation mode is a pen-up click mode, the driver 8 sets pen-down=0 of the status (step S22, no pen-down is added to the status). In this case, the status is an internal status of the driver 8, and is stored in an area different from the aforesaid status of the tablet controller 7.

On the other hand, in the case where the operation mode is a normal mode and not a pen-up click mode, the driver 8 sets pen-down=1 of the status (step S23, the pen-down is added to the status).

Next, the driver 8 transmits the status and coordinate data (data received from the tablet controller 7) to the OS 9 (step S24).

Subsequently, the driver 8 receives the next data (step S25). Then, the driver 8 makes a judgment whether or not pen-up is detected (step S26). Namely, this is a judgment whether or not the pen-down completion flag transmitted from the tablet controller 7 is "1".

In the case where pen-up is not detected, the driver 8 returns the control sequence to step S24. In the manner as described above, the status and coordinate data are transmitted to the OS 9 until pen-up is detected.

When detecting the pen-up click mode, the driver 8 makes a judgment whether or not the operation mode is a pen-up click mode or normal mode (step S27). In the case where the operating mode is a pen-up click mode, the driver 8 sets the following data, pen-down=1, count=0 and pen-up=1 to the status (step S28).

By doing so, the above pen-up and pen-down are simultaneously set (this is equivalent to validation procedure) Moreover, the count is a timer set value (unit of millisecond) for specifying a transition time from the pen-down to the pen-up. In step S28 of FIG. 6, the count is set to "0"; therefore, the transition from the pen-down to the pen-up is made at zero time.

For example, when the count is set to 100, 100 milliseconds are spent for the transition from the pen-down to the pen-up. In the operation as shown in FIG. 3, 100 milliseconds are take to display a filling pattern 108.

On the other hand, in the case where the operating mode is a normal mode, the driver 8 sets pen-up=1 to the status (step S29).

Next, the driver 8 transmits the status and coordinate data to the OS 9 (step S30), and then, ends the procedure.

FIG. 7 shows a procedure by the OS 9. First, the OS 9 receives a data from the driver 8 (step S40).

Next, the OS 9 makes a judgment whether or not the pen is in a pen-down state (step S41). This judgment is made depending upon the pen-down state flag and the pen-down state start flag of the status transmitted from the driver 8.

In the case where the pen is in the pen-down state, the OS 9 executes drag processing (step S42). For example, in this processing, drawing by a filling command is started on the screen of drawing program. Moreover, an object displayed on the display device 5 is moved with the movement of pen. The OS 9 receives the next data together with the above drag processing.

Subsequently, the OS 9 makes a judgment whether or not the pen is in a pen-up state (step S43). This judgment is made depending upon the pen-down state completion flag of the status transmitted from the driver 8.

In the case where the pen is not in the pen-up state, the OS 9 returns the control sequence to step S42. In the manner as described above, the OS 9 continues the drag processing until the pen-up state is detected.

On the other hand, in the case where the pen-up state is detected, the OS 9 executes drag release processing (step S44). In this drag release processing the drag processing is completed. In other words, drawing by the filling command is stopped. In addition, the dragged object is released. Thereafter, the OS 9 ends the above procedure.

On the contrary, in the case where the pen is not the pen-down state in the judgment made in step S41, the OS 9 executes cursor movement processing, that is, processing for moving a pointer to a coordinate corresponding to the received data (step S45). Then, the OS 9 receives the next data together with the above cursor movement processing.

Next, the OS 9 makes a judgment whether or not the pen is in a pen-down state (step S46). This judgment is made depending upon the pen-down state start flag of the status transmitted from the driver 8.

In the case where the pen is not the pen-down state, the OS 9 returns the control sequence to step S45. In the manner as described above, the OS 9 continues the cursor movement processing until the pen-down state is detected.

On the other hand, in the case of detecting the pen-down, the OS 9 sets a wait time to a timer (step S47). The wait time set to the timer is a count value set by the driver 8.

Next, the OS 9 executes predetermined processing after pen-down (step S48). For example, this processing is the start of drawing by the filling command shown in FIG. 3, and is a report of the pen-down to the object represented by the icon of FIG. 4.

Subsequently, the OS 9 makes a judgment whether or not a wait time elapses (step S49). Then, the OS 9 continues the processing of step S48 until the wait time elapses.

When the above wait time elapses, the OS 9 executes predetermined processing after pen-down (step S50). For example, the drawing program of FIG. 3 completes filling. Moreover, an application program corresponding to the icon displayed on the desktop screen of FIG. 4 is started up.

As described above, in the pen-operating computer 1 according to this embodiment, when the pen is in a pen-up state, the pen-down, the status of pen-up and the transition time from the pen-down to the pen-up are detected.

Therefore, it is possible to accurately point a specified place, for example, a specified icon or the like. In particular, in the case where the object of the icon generates an operation by both events of the pen-down and the pen-up, instructions can be accurately given.

Moreover, in the pen-operating computer 1 according to this embodiment, it is possible to set a count for specifying a transition time from pen-down to pen-up. Therefore, a time effect can be expressed in the pen-up click mode.

<Modification Example>

The present invention is applicable not only to the pen-operating computer detailedly described in the above embodiment, but also to various electronic equipments such as a PDA (Personal Digital Assistance) which is an equipment including a tablet, a navigation system, a word processor, various on-line terminals, etc.

The above embodiment has explained about the pen computer 1 which detects a pen operation with respect to the tablet 6 provided in a state of being overlapped with the display device 5. The present invention is not limited to the construction as described above.

For example, in place of the aforesaid touch screen type tablet 6, a so-called graphics tablet may be used such as a pen and pack point on a flat plate independent from the display device 5.

Moreover, in place of the construction of depressing the tablet 6 by pen, a mouse, a trackball, a joystick, an electrostatic touch pad, a stick-type pointing device or an optical pointing device may be used. More specifically, the present invention is applicable to a general input device, which specifies a position of object on the display device 5, and instructs the position by a depression operation and the release operation.

In this case, in place of the depression operation by pen, it may detect a depression and the depression release of a mouse, a track ball, a joystick, an electrostatic touch pad, a stick-type pointing device and an optical pointing device with respect to the button.

In the aforesaid mouse, track ball, electrostatic touch pad, stick-type pointing device and optical pointing device, the movement operation is detected in place of the depressed state by pen, unlike the tablet 6. Moreover, in these point devices, displacement, that is, moving direction and movement rate (or moving direction and depression time) is detected. The coordinate is generated in the control unit 2 on the basis of the movement rate. In this case, the operation relative to depression and the depression release is the same as the tablet 6 of the above embodiment, therefore, the present invention is applicable to these pointing devices.

In the above embodiment, a changeover of the normal mode and the pen-up click mode has been carried out by the operation mode selection menu 51 included in the drawing program. The present invention is not limited to the above construction.

For example, the operation mode may be changed over by a popup menu. Further, the operation mode may be collectively changed over by an environment setup menu (not shown) included in the pen-operating computer 1 in all programs stored in the pen-operating computer 1. Furthermore, the operation mode may be changed over by electric and mechanical switches, and not the menu displayed on the screen.

The changeover result as described above is registered in a system file such as registry in Windows operating system manufactured by Microsoft Corporation in US, and thereafter, may be delivered to the driver 8.

In the above embodiment, the control for pen-up click mode has been realized according to the procedure executed by the tablet controller 7, the driver 8 and the OS 9. The present invention is not limited to the above construction.

For example, the tablet controller 7 executes the procedures shown in FIG. 5 to FIG. 7, and only communication with application program may be submitted to the driver 8 and the OS 9.

Further, the tablet controller 7 detects only operation to the tablet 6, and then, the procedures shown in FIG. 5 to FIG. 7 may be executed by only driver 8. In this case, the OS 9 may execute only communication between the driver 8 and application program.

Further, the procedures shown in FIG. 5 to FIG. 7 may be executed by only OS 9. In this case, the tablet controller 7 and the driver 8 may detect only operation to the tablet 6.

Further, in window system library linked with application program, or in a screen management program such as Windows system of Microsoft Corporation and window manager in X-window system, the pen-up click mode may be controlled. In order to carry out the control, the procedures shown in FIG. 5 to FIG. 7 may be executed in these programs as described above.

Further, in application program, the pen-up click mode may be controlled. More specifically, in the application program, an information indicative of depression are made invalid and valid in accordance with notified status and specified mode so as to realize the function shown in the above embodiment.

In the case of carrying out no procedure of FIG. 5 by the tablet controller 7, the tablet controller 7 is not necessarily required. More specifically, if a signal transmitting unit for transmitting a signal of tablet 6 to the control unit 2, for example, an A/D converter is provided, no tablet controller 7 is required. In this case, the control unit 2 directly detects a signal from the tablet 6. In the case where the control unit 2 directly detects a signal from the tablet 6, the driver 8 is equivalent to a detection unit. In such a case, the driver 8 is also equivalent to an output unit.

<Computer Readable Recording Medium>

In the above embodiment, it is possible to record the program for executing the procedures by the driver 8 (see FIG. 6) and the OS 9 (see FIG. 7) in a computer readable recording medium. Then, when reading and executing the program recorded in the recording medium, the computer functions as the control unit 2 shown in the above embodiment.

In this case, the computer readable recording medium is a recording medium, which stores information such as data, program and the like by electric, magnetic, optical, mechanical or chemical action, and can read them from the computer. Of the above recording medium, to give an example of the recording medium removable from the computer, there are a floppy disk, a magnet-optic disk, a CD-ROM, a CD=R/W, a DVD, a DAT, a 8 mm tape, a memory card and the like.

Moreover, as an example of the recording medium fixed to the computer, there are a hard disk, a ROM (Read Only Memory) and the like.

<Data Communication Signal Embodied in Carrier Wave>

Moreover, the above program is stored in the hard disk or memory of the computer, and thereafter, may be distributed to other computers via a communication medium. In this case, the program is transmitted through the communication medium as a data communication signal embodied in a carrier wave. The computer receiving the data communication signal thus distributed can function as the control unit 2 shown in the above embodiment.

In this case, the communication medium may be any of wire communication mediums, e.g., metal cable including coaxial cable and twist pair cable, optical communication cable, etc., or wireless communication mediums, e.g., satellite communications, terrestrial (ground wave) wireless communications.

The carrier wave is an electromagnetic wave or light for modulating a data communication signal. In addition, the carrier wave may be a direct current signal. In this case, the data communication signal has a base band waveform having no carrier. Therefore, the data communication signal embodied in a carrier wave may be any of a modulated broadband signal and a no-modulated base band signal (equivalent to the case a direct current signal of voltage 0V is used as a carrier wave)

What is claimed is:

1. A control device outputting information in accordance with an operation with respect to an input device, comprising:
    a detection unit detecting a depression and a release of the depression with respect to the input device;
    an output unit outputting information indicative of the depression with respect to the input device and information indicative of the depression release when detecting the depression release; and
    a timer unit setting a time of an interval from the detection of the depression to the information output indicative of the depression release,
    wherein the information indicative of the depression with respect to the input device and the information indicative of the depression release are the information corresponding to the position of the depression release, and when 0 is set into the timer unit, the output unit immediately invalidates the information output indicative of the depression when detecting the depression, and when a predetermined interval time other than 0 is set into the timer unit, the output unit invalidates the information output indicative of the depression after the predetermined interval time when detecting the depression.

2. The control device according to claim 1, wherein the detection unit detects the depression with respect to the input device, and the output unit invalidates the information output indicative of the depression and outputs information of a movement operation with respect to the input device when the depression with respect to the input device is detected.

3. The control device according to claim 1, wherein the detection unit detects a movement operation with respect to the input device, and the output unit outputs a position on a screen of a display device corresponding to the movement operation.

4. The control device according to claim 1, wherein the output unit decides whether or not the information indicative of the depression is outputted at a time selected among a time when a release of the depression is detected or a time when a depression is made with respect to the input device, in accordance with a mode of controlling the information output indicative of the depression.

5. The control device according to claim 1, wherein the input device is a tablet.

6. An electronic apparatus including an input device, comprising:
    a detection unit detecting a depression and a release of the depression with respect to the input device;
    an output unit outputting information indicative of the depression with respect to the input device and information indicative of the depression release when detecting the depression release; and
    a timer unit setting a time of an interval from the detection of the depression to the information output indicative of the depression release,
    wherein the information indicative of the depression with respect to the input device and the information indicative of the depression release are the information corresponding to the position of the depression release, and when 0 is set into the timer unit, the output unit immediately invalidates the information output indicative of the depression when detecting the depression, and when a predetermined interval time other than 0 is set into the timer unit, the output unit invalidates the information output indicative of the depression after the predetermined interval time when detecting the depression.

7. A control method for an input device, comprising:

detecting a depression and a release of the depression with respect to an input device; outputting information indicative of the depression and information indicative of the release of the depression when the release of depression is detected; and setting a time of an interval from the detection of the depression to the information output indicative of the depression release, wherein the information indicative of the depression with respect to the input device and the information indicative of the depression release are the information corresponding to the position of the depression release, and when 0 is set as the time, the information output indicative of the depression is immediately invalidated when detecting the depression, and when a predetermined interval time other than 0 is set, the information output indicative of the depression is invalidated after the predetermined interval time when detecting the depression.

8. A computer readable recording medium recording a program executing which when executed by a computer causes the computer to execute the functions comprising:

detecting a depression and a release of the depression with respect to an input device by a computer connected with the input device;

outputting information indicative of the depression and information indicative of the release of the depression when the release of the depression is detected; and setting a time of an interval from the detection of the depression to the information output indicative of the depression release, wherein the information indicative of the depression with respect to the input device and the information indicative of the depression release are the information corresponding to the position of the depression release, and when 0 is set as the time, the information output indicative of the depression is immediately invalidated when detecting the depression, and when a predetermined interval time other than 0 is set, the information output indicative of the depression is invalidated after the predetermined interval time when detecting the depression.

* * * * *

UNITED STATES PATENT AND TRADEMARK OFFICE
CERTIFICATE OF CORRECTION

PATENT NO. : 7,495,658 B2 Page 1 of 1
APPLICATION NO. : 09/814834
DATED : February 24, 2009
INVENTOR(S) : Takeshi Kubo et al.

It is certified that error appears in the above-identified patent and that said Letters Patent is hereby corrected as shown below:

Column 11, Lines 4-9, Claim 7, change
"7. A control method for an input device, comprising:

detecting a depression and a release of the depression with respect to an input device; outputting information indicative of the depression and information indicative of the release of the depression when the release of depression is detected; and" to

--7. A control method for an input device, comprising:

detecting a depression and a release of the depression with respect to an input device;

outputting information indicative of the depression and information indicative of the release of the depression when the release of depression is detected; and--.

Signed and Sealed this

Twelfth Day of May, 2009

JOHN DOLL
*Acting Director of the United States Patent and Trademark Office*